(12) United States Patent
Zhang et al.

(10) Patent No.: US 12,029,976 B2
(45) Date of Patent: Jul. 9, 2024

(54) FRAME DISPLAY METHOD AND APPARATUS IN GAME APPLICATION, TERMINAL, AND STORAGE MEDIUM

(71) Applicant: Tencent Technology (Shenzhen) Company Limited, Shenzhen (CN)

(72) Inventors: Peng Zhang, Shenzhen (CN); Chen Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 459 days.

(21) Appl. No.: 17/527,044

(22) Filed: Nov. 15, 2021

(65) Prior Publication Data
US 2022/0072420 A1 Mar. 10, 2022

Related U.S. Application Data

(63) Continuation of application No. PCT/CN2021/077444, filed on Feb. 23, 2021.

(30) Foreign Application Priority Data

Apr. 1, 2020 (CN) .......................... 202010251356.8

(51) Int. Cl.
A63F 13/44 (2014.01)
A63F 13/25 (2014.01)
(Continued)

(52) U.S. Cl.
CPC .............. *A63F 13/44* (2014.09); *A63F 13/25* (2014.09); *G09G 3/2096* (2013.01);
(Continued)

(58) Field of Classification Search
CPC .......... A63F 13/25; A63F 13/44; A63F 13/45; A63F 13/52; A63F 13/533; A63F 13/58;
(Continued)

(56) References Cited

U.S. PATENT DOCUMENTS 10,524,008 B2 12/2019 Green et al.
2002/0188361 A1 12/2002 Chudley et al.
(Continued)

FOREIGN PATENT DOCUMENTS

CN 102547390 A 7/2012
CN 106385408 A 2/2017
(Continued)

OTHER PUBLICATIONS

"League of Legends Wiki", Feb. 14, 2017, <https://leagueoflegends.fandom.com/wiki/Cooldown?oldid=2492029> (Year: 2017).*
(Continued)

*Primary Examiner* — Justin L Myhr
(74) *Attorney, Agent, or Firm* — Morgan, Lewis & Bockius LLP

(57) ABSTRACT

This application provides a frame display method in a game application performed by a computer device. The method includes: receiving a frame message within a first cooldown period of a target skill; determining whether the first cooldown period ends, according to a remaining time of the first cooldown period and a frame interval time; determining a compensation time corresponding to the first cooldown period according to an actual time of the first cooldown period and a adjusted cooldown time of the target skill when the first cooldown period ends; and displaying a skill cooling image of the target skill in a next image frame, and entering a second cooldown period of the target skill. In this application, the number of frames overflowed previously is made up each time a skill is released, to ensure that the actual number of frames under acceleration/deceleration is close to the theoretical number of frames.

20 Claims, 5 Drawing Sheets

(51) Int. Cl.
  *G09G 3/20* (2006.01)
  *A63F 13/533* (2014.01)
  *A63F 13/822* (2014.01)
(52) U.S. Cl.
  CPC .......... *A63F 13/533* (2014.09); *A63F 13/822* (2014.09); *A63F 2300/308* (2013.01); *A63F 2300/638* (2013.01); *G09G 2340/0435* (2013.01)
(58) Field of Classification Search
  CPC ........ A63F 13/75; A63F 13/822; A63F 13/92; A63F 2300/308; A63F 2300/638; G09G 2340/0435; G09G 3/20; G09G 3/2096; G09G 5/12
  See application file for complete search history.

(56) References Cited

U.S. PATENT DOCUMENTS

| | | | |
|---|---|---|---|
| 2010/0022302 | A1 | 1/2010 | Iwakiri et al. |
| 2017/0157512 | A1* | 6/2017 | Long .................... A63F 13/86 |
| 2018/0330574 | A1 | 11/2018 | Wright et al. |
| 2019/0158781 | A1 | 5/2019 | Kabuto |
| 2019/0238952 | A1 | 8/2019 | Boskovich |

FOREIGN PATENT DOCUMENTS

| | | |
|---|---|---|
| CN | 106409315 A | 2/2017 |
| CN | 106463094 A | 2/2017 |
| CN | 107426156 A | 12/2017 |
| CN | 109513208 A | 3/2019 |
| CN | 109893857 A | 6/2019 |
| CN | 110538452 A | 12/2019 |
| CN | 110694261 A | 1/2020 |
| CN | 111467798 A | 7/2020 |
| CN | 111467798 B | 9/2021 |
| EP | 1772173 A1 | 4/2007 |
| JP | 2010042090 A | 2/2010 |
| JP | 7301161 B2 | 6/2023 |
| WO | WO 2007044861 A2 | 7/2007 |
| WO | WO 2019237821 A1 | 12/2019 |

OTHER PUBLICATIONS

Tencent Technology, Korean Office Action, KR Patent Application No. 10-2021-7035202, Sep. 13, 2023, 5 pgs.
Extended European Search Report, EP21778336.4, May 25, 2022, 8 pgs.
Tencent Technology, WO, PCT/CN2021/077444, May 19, 2021, 4 pgs.
Tencent Technology, IPRP, PCT/CN2021/077444, Sep. 29, 2022, 5 pgs.
Tencent Technology, Singapore Office Action, SG Patent Application No. 11202111199W, Jan. 27, 2023, 6 pgs.
Tencent Technology, Japanese Office Action, JP Patent Application No. 2021-565860, Jan. 4, 2023, 4 pgs.
Little Y E-Sports Game, "LOL: A Neglected Jungler, Udyr Who Has No Displacement Skills But Can Run Very Well", Apr. 21, 2018, 6 pgs., Retrieved from the Internet: https://baijiahao.baidu.com/s?id=1598338285289844132&wrf=spider&for=pc.
Tencent Technology, ISR, PCT/CN2021/077444, May 19, 2021, 2 pgs.
Tencent Technology, Indonesian Office Action, ID Patent Application No. P00202110845, Apr. 3, 2024, 5 pgs.

* cited by examiner

FRAME DISPLAY METHOD AND APPARATUS IN GAME APPLICATION, TERMINAL, AND STORAGE MEDIUM

CROSS-REFERENCE TO RELATED APPLICATIONS

This application is a continuation application of PCT Patent Application No. PCT/CN2021/077444, entitled "FRAME DISPLAY METHOD AND APPARATUS IN GAME APPLICATION, TERMINAL, AND STORAGE MEDIUM" filed on Feb. 23, 2021, which claims priority to Chinese Patent Application No. 202010251356.8, filed with the State Intellectual Property Office of the People's Republic of China on Apr. 1, 2020, and entitled "FRAME DISPLAY METHOD AND APPARATUS IN GAME APPLICATION, TERMINAL, AND STORAGE MEDIUM", all of which are incorporated herein by reference in their entirety.

FIELD OF THE TECHNOLOGY

Embodiments of this application relate to the field of computer technologies, and in particular, to a frame display method and apparatus in a game application, a terminal, and a storage medium.

BACKGROUND OF THE DISCLOSURE

A frame synchronization technology is a technology for pixel-level synchronous display of a synchronization source. For a plurality of accessors on a network, one signal may be synchronously sent to others through a host, and displayed on each terminal synchronously. The frame synchronization technology is generally applied to the game field.

In the related art, "frame" is the smallest measurement unit of time, and any acceleration performance effect in a game needs to be constrained by the smallest measurement unit "frame". For example, assuming that a length of one action is 7 frames at normal playback speed, an interval between two actions is reduced to 6.09 frames, when the playback speed increases by 15%. Because 6.09 frames are greater than 6 frames, subject to the constraint of "frame", the action is not played completely until the $7^{th}$ frame is played.

In the related art, due to the constraint of the smallest measurement unit "frame", there is a large error between the actual number of frames and the theoretical number of frames during accelerated playback.

SUMMARY

Embodiments of this application provide a frame display method and apparatus in a game application, a terminal, and a storage medium, which can reduce an error between the actual number of frames and the theoretical number of frames. The technical solutions are as follows:

According to one aspect, an embodiment of this application provides a frame display method in a game application, the method including:
receiving a frame message within a first cooldown period of a target skill, the frame message being used for driving to display a next image frame;
determining whether the first cooldown period ends, according to a remaining time of the first cooldown period and a frame interval time;
in response to that the first cooldown period ends, determining a compensation time corresponding to the first cooldown period according to an actual time of the first cooldown period and an adjusted cooldown time of the target skill; and
displaying a skill release image of the target skill in the next image frame in response to the frame message, and entering a second cooldown period of the target skill, an initial time length of the second cooldown period being determined based on the adjusted cooldown time and the compensation time.

According to still another aspect, an embodiment of this application provides a computer device, including a processor and a memory, the memory storing at least one program, the at least one program being loaded and executed by the processor to implement the frame display method in a game application in the foregoing aspect.

According to yet another aspect, an embodiment of this application provides a non-transitory computer-readable storage medium, storing at least one program, the at least one program being loaded and executed by a processor to implement the frame display method in a game application in the foregoing aspect.

The technical solutions provided in the embodiments of this application may include the following beneficial effects:

Whether a first cooldown period ends is determined according to a remaining time of the first cooldown period and a frame interval time: a compensation time corresponding to the first cooldown period is determined according to an actual time of the first cooldown period and an adjusted cooldown time of a target skill when the first cooldown period ends; and further, an initial time length of a second cooldown period is determined based on the adjusted cooldown time and the compensation time. Compared to the related art, due to the constraint of the smallest measurement unit "frame", an error between the actual number of frames and the theoretical number of frames is large during accelerated play back. In the technical solutions provided in the embodiments of this application, by means of a time compensation manner, the number of frames overflowed previously is made up each time a skill is released, to ensure that the actual number of frames under acceleration/deceleration is close to the theoretical number of frames, and reduce an error between the actual number of frames and the theoretical number of frames, thereby ensuring that a specific skill is continuously released for a period of time. A quantity of times the skill can be released during this period of time is more proper and accurate, and an expected acceleration/deceleration effect is achieved, thereby making release rate control of a game skill more accurate.

DESCRIPTION OF EMBODIMENTS

To make objectives, technical solutions, and advantages of this application clearer, the following further describes implementations of this application in detail with reference to the accompanying drawings.

First, related terms involved in this application are explained.

1. Virtual Scene

A virtual scene is a scene displayed (or provided) when a client of an application (such as a game application) runs on a terminal. The virtual scene refers to a scene created for a virtual object to perform activities (such as game competition). The virtual scene may be, for example, a virtual house, a virtual island, or a virtual map. The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene, which is not limited in the embodiments of this application.

2. Virtual Object

A virtual object is a virtual role controlled by a user account in an application. For example, the application is a game application. The virtual object is a game character controlled by the user account in the game application. The virtual object may be in a human form or animal, cartoon, or other forms, which is not limited in the embodiments of this application. The virtual object may be presented in a three-dimensional form or a two-dimensional form, which is not limited in the embodiments of this application.

In different game applications, operations that may be performed by the virtual object controlled by the user account may be different. For example, in an STG application, the user account may control the virtual object to perform operations such as shooting, running, jumping, gun picking up, gun replacing, and bullet loading.

Certainly, apart from game applications, another type of application may also present a virtual object to a user and provide a corresponding function for the virtual object. For example, an augmented reality (AR) application, a social application, or an interactive entertainment application, which is not limited in the embodiments of this application. Besides, the form and corresponding function of the virtual object vary with different applications, and may be preset according to an actual requirement, which is not limited in the embodiments of this application.

Figure 1:
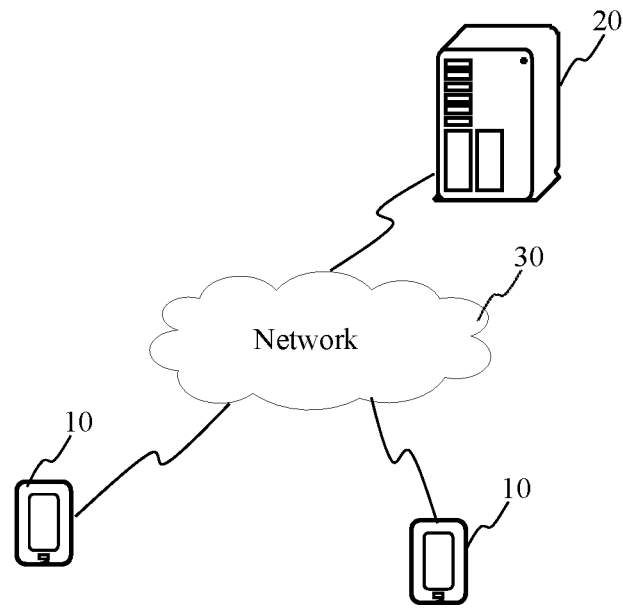
FIG. 1 is a schematic diagram of an implementation environment according to an embodiment of this application.

FIG. 1 shows a schematic diagram of an implementation environment according to an embodiment of this application. The implementation environment may include a terminal 10 and a server 20.

The terminal 10 may be, for example, a mobile phone, a personal computer (PC), a tablet computer, an e-book reader, an electronic game machine, and a moving picture experts group audio layer IV (MP4) player.

A client of a game application such as a client of a shooting game application may be installed in the terminal 10. The shooting game application may be any one of a first person shooting (FPS) game application, a third person shooting (TPS) game application, a multiplayer online battle arena (MOBA) game application, and a multiplayer gunfight survival game application. In an exemplary embodiment, the game application may be a standalone application, such as a standalone 3D game application, or may be a network online application.

The server 20 is configured to provide a back-end service to a client of an application (for example, a game application) in the terminal 10. For example, the server 20 may be a back-end server of the application (for example, the game application). The server 20 may be one server, a server cluster including a plurality of servers, or a cloud computing service center.

The terminal 10 may communicate with the server 20 through a network 30. The network 30 may be a wired network or a wireless network.

Figure 2:
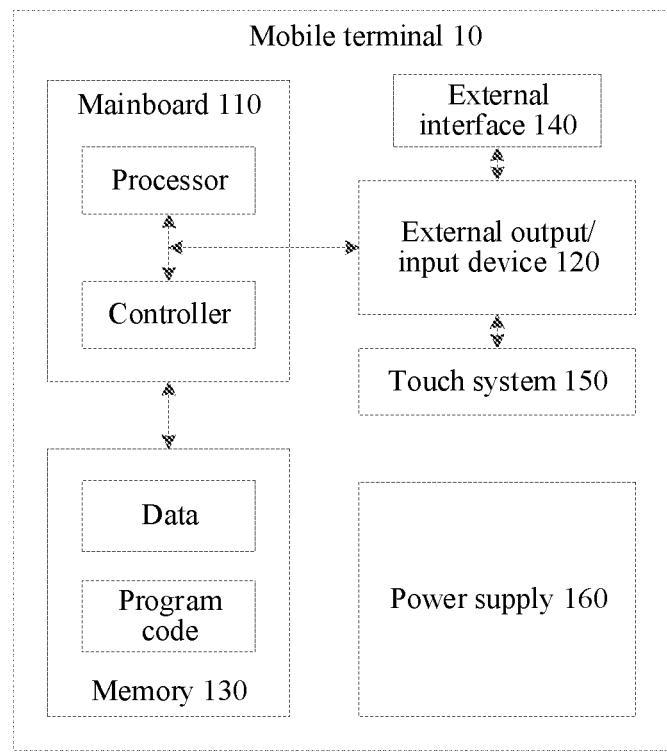
FIG. 2 is a schematic structural diagram of a terminal according to an embodiment of this application.

In method embodiments of this application, an execution body of each step may be a terminal, for example, the execution body of each step may be a client of the application (for example, a game application or another application). FIG. 2 shows a schematic structural diagram of a terminal according to an embodiment of this application. The terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons.

The memory 130 stores program code and data.

The external interface 140 may include an earphone interface, a charging interface, and a data interface.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 10.

In the embodiments of this application, the processor in the mainboard 110 may generate a user interface (UI) (for example, a game interface) by executing or invoking the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

The technical solutions of this application are described below by using several embodiments.

Figure 3:
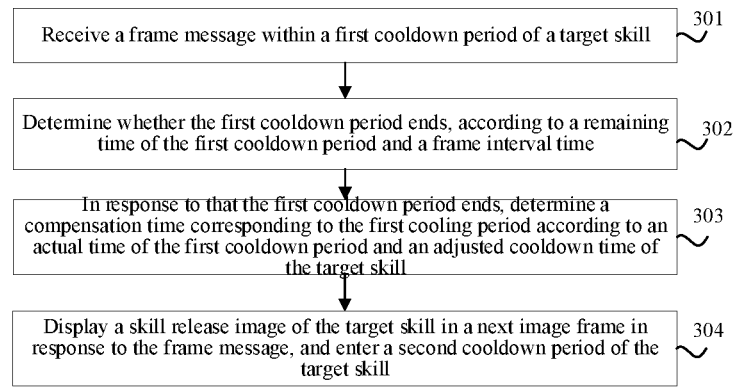
FIG. 3 is a flowchart of a frame display method in a game application according to an embodiment of this application.

FIG. 3 shows a flowchart of a frame display method in a game application according to an embodiment of this application. In this embodiment, an example in which the method is performed by a terminal of the implementation environment shown in FIG. 1 is mainly used for descriptions. For example, the method may be performed by a client of a game application installed and run in the terminal. The method may include the following steps:

Step 301. Receive a frame message within a first cooldown period of a target skill.

A user runs a client of a game application installed in a terminal, and the client may display a UI of the game application. The UI refers to a displayed image used for presenting a virtual scene to a user. The UI may display a virtual scene and elements such as a virtual building, a virtual prop, and a virtual object in the virtual scene. The virtual object may be a virtual object controlled by a user using the terminal in the game. The virtual object has been introduced above, and is not described herein again.

In a game, a plurality of skills may be provided for a virtual object. The skill may be a skill configured by default or a random skill. For example, before a game starts, a plurality of skills may be displayed in the UI, and a user may select one of the plurality of skills as a target skill; or when a virtual object controlled by a user meets a specific condition (for example, a combo score is greater than a preset score), a plurality of skills are displayed in the UI, and a user may select one of the plurality of skills as a target skill.

When a target skill is used, a skill release image of the target skill may be displayed in the UI. The skill release image may be an image frame among a plurality of image frames, or may be a single image frame, which is not limited in this embodiment of this application.

The target skill refers to an object with a cooldown period, which may be a virtual weapon, a virtual prop, an attribute, or a special effect used by the virtual object. Fighting power or vitality of a virtual object can be improved by using a target skill. For example, the target skill may be jumping, teleporting, hitting, or recovery.

The cooldown period refers to a time from a moment at which the target skill is used once to a moment at which the target skill can be used next time, that is, a reset time of the target skill. Within the cooldown period, the target skill cannot be used again.

In one example, during a game, a skill control of the target skill may be displayed on the UI. A user may click the skill control once to control a virtual object to use the target skill once. When a user consecutively clicks the skill control for a plurality of times within a short period of time, the virtual object may be controlled to consecutively use the target skill. In another example, a user may click the skill control once to control an object to consecutively use the target skill.

There are a plurality of cooldown periods in the process of consecutively using the target skill. Within the first cooldown period of the target skill, the client may receive the frame message, the frame message being used for driving to display a next image frame. The first cooldown period may be any cooldown period of the target skill.

Step 302. Determine whether the first cooldown period ends, according to a remaining time of the first cooldown period and a frame interval time.

After receiving the frame message, a cooldown time manager may be driven to determine whether the first cooldown period ends, according to the remaining time of the first cooldown period and the frame interval time. The cooldown time manager is configured to manage a cooldown time of a skill.

The remaining time of the first cooldown period refers to a time count between the first cooldown period and a time from a moment at which the target skill enters the first cooldown period to a current moment. For example, if a period time of the first cooldown period is A, and a time from a moment at which the target skill enters the first cooldown period to a current moment is B, a remaining time of the first cooldown period is A-B.

The frame interval time refers to a time interval between two frame messages. The frame interval time may be converted from a physical time, and the frame interval time is usually a fixed value. For example, if 30 frame messages are received within 1s, a frame interval time is about 0.033 s.

In a possible implementation, the determining whether the first cooldown period ends, according to the remaining time of the first cooldown period and the frame interval time may include:

(1) Determine that the first cooldown period ends, when the remaining time of the first cooldown period is less than or equal to the frame interval time.

The client may compare the remaining time of the first cooldown period to the frame interval time, and determine that the first cooldown period ends, when the remaining time of the first cooldown period is less than or equal to the frame interval time. For example, assuming that the remaining time of the first cooldown period is cdTimeRemain, and the frame interval time is deltaTime, when cdTimeRemainsdeltaTime, it is determined that the first cooldown period ends.

(2) Determine that the first cooldown period does not end, when the remaining time of the first cooldown period is greater than the frame interval time; and update the remaining time of the first cooldown period, and display a skill cooling image of the target skill in the next image frame in response to the frame message.

The client may compare the remaining time of the first cooldown period to the frame interval time, and it is determined that the first cooldown period does not end, when the remaining time of the first cooldown period is greater than the frame interval time. In this case, one frame interval time may be subtracted from a remaining time of a previous first cooldown period to obtain an updated remaining time of the first cooldown period; and the skill cooling image of the target skill is displayed in the next image frame in response to the frame message.

The skill cooling image of the target skill refers to an image when the target skill is in a skill cooldown period.

In another possible implementation, the determining whether the first cooldown period ends, according to the remaining time of the first cooldown period and the frame interval time may include:

(1) determining that the first cooldown period ends, when the remaining time of the first cooldown period is equal to 0; and (2) determining that the first cooldown period does not end, when the remaining time of the first cooldown period is greater than 0 and less than the frame interval time; and updating the remaining time of the first cooldown period to 0, and displaying the skill cooling image of the target skill in the next image frame in response to the frame message.

It is directly determined that the first cooldown period ends, when the remaining time of the first cooldown period is equal to 0.

It is determined that the first cooldown period does not end, when the remaining time of the first cooldown period is greater than 0 and less than the frame interval time. In this case, the remaining time of the first cooldown period may be directly updated to 0, and the skill cooling image of the target skill is displayed in the next image frame in response to the frame message.

Step 303. Determine a compensation time corresponding to the first cooldown period according to an actual time of the first cooldown period and an adjusted cooldown time of the target skill in response to that the first cooldown period ends.

After determining that the first cooldown period ends, the compensation time corresponding to the first cooldown period may be determined, and the compensation time corresponding to the first cooldown period may be recorded, so as to compensate when an initial time length of a second cooldown period is determined.

The actual time of the first cooldown period refers to an actual time from a moment at which the target skill is released to a moment of entering a cooldown time. The adjusted cooldown time of the target skill refers to a cooldown time when a target double speed is increased or reduced by an attack speed of the target skill.

In an exemplary embodiment, the adjusted cooldown time of the target skill may be determined through the following steps:

(1) obtaining an original cooldown time and an attack speed adjustment parameter of the target skill; and
(2) determining the adjusted cooldown time of the target skill according to the original cooldown time and the attack speed adjustment parameter.

The original cooldown time of the target skill refers to a cooldown time when a preset attack speed is not adjusted (increased or decreased) by a game designer when designing the target skill. The attack speed adjustment parameter refers to a parameter used for adjusting an attack speed, and may be used for increasing or reducing the attack speed.

After obtaining the original cooldown time and the attack speed adjustment parameter of the target skill, the adjusted cooldown time of the target skill may be determined according to the original cooldown time and the attack speed adjustment parameter.

For example, assuming that the original cooldown time of the target skill is 1.5 s, that is, the cooldown time is 1.5 s at 1× attack speed, the cooldown time is 1 s when the attack speed is increased to 1.5 times the speed, that is, the adjusted cooldown time of the target skill is 1 s.

In another example, assuming that the original cooldown time of the target skill is 7 frames, that is, the cooldown time is 7 frames at 1× attack speed, the cooldown time is 6.54 frames when the attack speed is increased to 1.07 times, that is, the adjusted cooldown time of the target skill is 6.54 frames.

In an exemplary embodiment, the determining a compensation time corresponding to the first cooldown period, according to an actual time of the first cooldown period and a adjusted cooldown time of the target skill may include: calculating a difference between the actual time of the first cooldown period and the adjusted cooldown time of the target skill to obtain the compensation time corresponding to the first cooldown period.

In a possible implementation, when it is determined that the first cooldown period ends, when the remaining time of the first cooldown period is less than the frame interval time, the actual time of the first cooldown period is less than the adjusted cooldown time of the target skill. In this case, the compensation time corresponding to the first cooldown period is the adjusted cooldown time of the target skill minus the actual time of the first cooldown period, and the compensation time corresponding to the first cooldown period is added to an adjusted cooldown time of the second cooldown period.

For example, assuming that the compensation time corresponding to the first cooldown period is cdOffsetValue, the actual time of the first cooldown period is cdTime-t, and the adjusted cooldown time of the target skill is cdTime-r, when the actual time of the first cooldown period is less than the adjusted cooldown time of the target skill, the compensation time corresponding to the first cooldown period may be expressed as:

$$cd\text{OffsetValue}=cd\text{Time-}r-cd\text{Time-}t.$$

In another possible implementation, when it is determined that the first cooldown period ends, when the remaining time of the first cooldown period is equal to 0, the actual time of the first cooldown period is equal to the adjusted cooldown time of the target skill. In this case, the compensation time corresponding to the first cooldown period is 0.

In yet another possible implementation, when it is determined that the first cooldown period does not end, when the remaining time of the first cooldown period is greater than the frame interval time, the actual time of the first cooldown period is greater than the adjusted cooldown time of the target skill. In this case, the compensation time corresponding to the first cooldown period is the actual time of the first cooldown period minus the adjusted cooldown time of the target skill, and the compensation time corresponding to the first cooldown period is subtracted from an adjusted cooldown time of the second cooldown period.

For example, assuming that the compensation time corresponding to the first cooldown period is cdOffsetValue, the actual time of the first cooldown period is cdTime-t, and the adjusted cooldown time of the target skill is cdTime-r, when the actual time of the first cooldown period is less than the adjusted cooldown time of the target skill, the compensation time corresponding to the first cooldown period may be expressed as:

$$cd\text{OffsetValue}=cd\text{Time-}t-cd\text{Time-}r.$$

In addition, a next frame message is waited for in response to that the first cooldown period does not end.

Step 304. Display a skill release image of the target skill in the next image frame in response to the frame message, and enter a second cooldown period of the target skill.

Driven by the frame message, the skill release image of the target skill is displayed in the next image frame. In this case, the second cooldown period of the target skill is entered.

Figure 4:
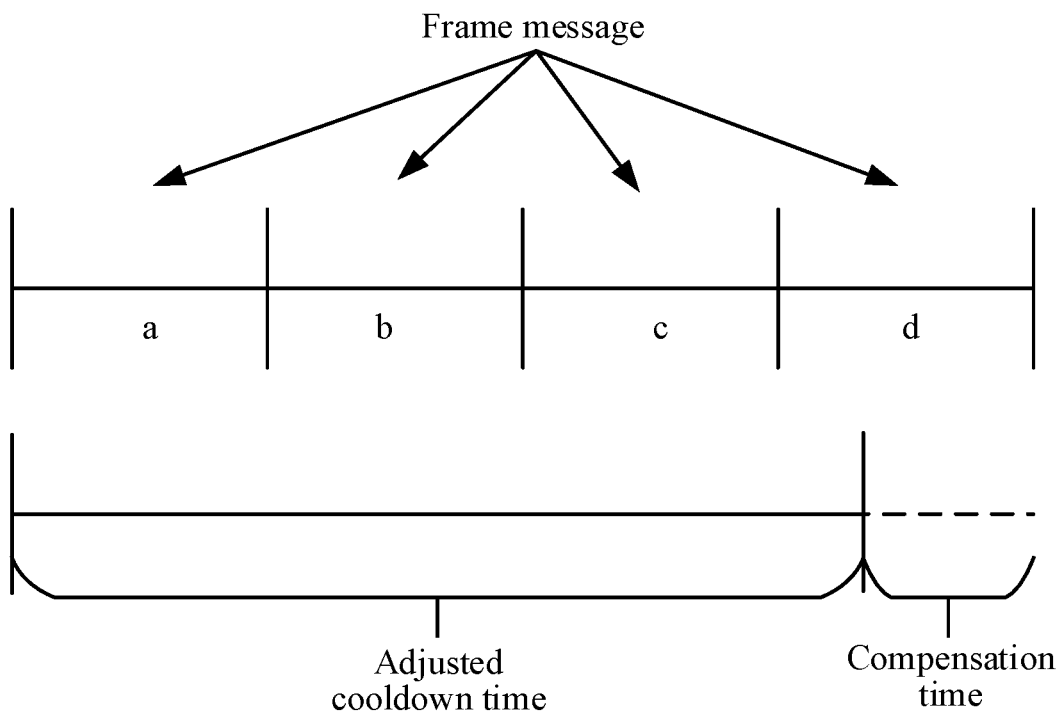
FIG. 4 exemplarily shows a schematic diagram of a compensation time of this application.

An initial time of the second cooldown period is determined based on the adjusted cooldown time and the compensation time. In an exemplary embodiment, the initial time of the second cooldown period may be the adjusted cooldown time plus the compensation time corresponding to the first cooldown period (as shown in FIG. 4) when the actual time of the first cooldown period is less than the adjusted cooldown time of the target skill: the initial time of the second cooldown period may be the adjusted cooldown time minus the compensation time corresponding to the first cooldown period when the actual time of the first cooldown period is greater than the adjusted cooldown time of the target skill; and the initial time of the second cooldown period is equal to the adjusted cooldown time when the actual time of the first cooldown period is equal to the adjusted cooldown time of the target skill.

For example, assuming that the adjusted cooldown time is 6.54 frames and the actual time of the first cooldown period is 7 frames, the compensation time is 0.46 frames, and the initial time of the second cooldown period is 6.54−0.46=6.08 frames.

In another example, assuming that the adjusted cooldown time is 6.54 frames, and the actual time of the first cooldown period is 6 frames, the compensation time is 0.54 frames, and the initial time of the second cooldown period is 6.54+0.54=7.08 frames.

In summary, in the technical solutions provided in the embodiments of this application, whether a first cooldown period ends is determined according to a remaining time of the first cooldown period and a frame interval time: a compensation time corresponding to the first cooldown period is determined according to an actual time of the first cooldown period and a adjusted cooldown time of a target skill when the first cooldown period ends; and further, an initial time length of a second cooldown period is determined based on the adjusted cooldown time and the compensation time. Compared to the related art, due to the constraint of the smallest measurement unit "frame", an error between the actual number of frames and the theoretical number of frames is large during accelerated play back. In the technical solutions provided in the embodiments of this application, by means of a time compensation manner, the number of frames overflowed previously is made up each time a skill is released, to ensure that the actual number of frames under acceleration/deceleration is close to the theoretical number of frames, and reduce an error between the actual number of frames and the theoretical number of frames, thereby ensuring that a specific skill is continuously released for a period of time. A quantity of times the skill can be released during this period of time is more proper and accurate, and an expected acceleration/deceleration effect is achieved, thereby making release rate control of a game skill more accurate.

Figure 5:
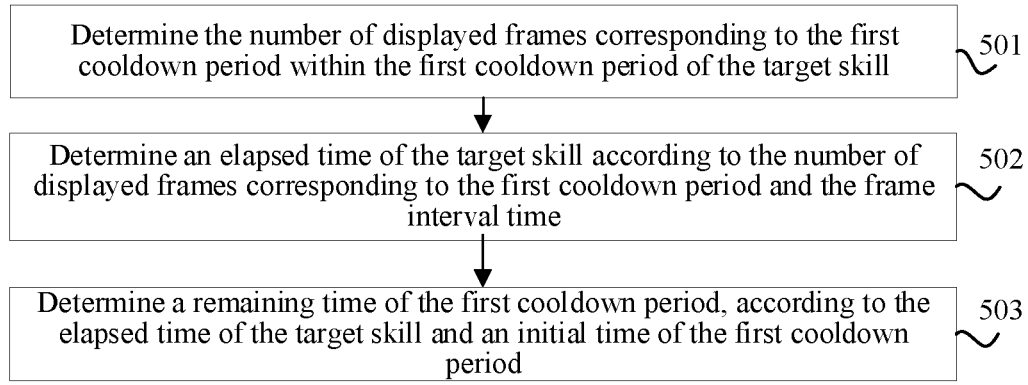
FIG. 5 is a flowchart of a frame display method in a game application according to another embodiment of this application.

In an exemplary embodiment provided based on the embodiment in FIG. 3, as shown in FIG. 5, the frame display method in a game application may further include the following steps:

Step 501. Determine the number of displayed frames corresponding to the first cooldown period within the first cooldown period of the target skill.

The number of displayed frames corresponding to the first cooldown period may be determined within the first cooldown period of the target skill when the target skill release includes a plurality of image frames. The number of displayed frames corresponding to the first cooldown period refers to the number of image frames that have been displayed from a moment of entering the first cooldown period to a current moment.

In a possible implementation, the determining the number of displayed frames corresponding to the first cooldown period may include:

(1) Obtain a total quantity of times a cooldown time manager is called within the first cooldown period.

The cooldown time manager is called k times each time a frame message is received, k is a rounded value of a sum of a residual value of an attack speed adjustment parameter corresponding to a previous frame and an attack speed adjustment parameter corresponding to a current frame, and k is a positive integer greater than 1.

For example, assuming that the attack speed adjustment parameter corresponding to the current frame is 1.5, and the residual value of the attack speed adjustment parameter corresponding to the previous frame is 0.5, the quantity of times k of the cooldown time manager being called is 2 when the frame message is received this time.

For example, assuming that the frame message may be received 3 times within the first cooldown period, when the frame message is received for the first time, the attack speed adjustment parameter is 1.5, a rounded value of the attack speed adjustment parameter is 1, and the residual value of the attack speed adjustment parameter is 0.5, and in this case, the cooldown time manager may be called for times of the rounded value of the attack speed adjustment parameter, that is, the cooldown time manager is called once: when the frame message is received for the second time, the attack speed adjustment parameter corresponding to the current frame is 1.5, and the residual value of the attack speed adjustment parameter of the frame message received for the first time is 0.5, and in this case, the cooldown time manager may be called twice; and when the frame message is received for the third time, the attack speed adjustment parameter corresponding to the current frame is 1.5, and the residual value of the attack speed adjustment parameter of the frame message received for the second time is 0, and in this case, the cooldown time manager may be called once. Therefore, the total quantity of times the cooldown time manager is called within the first cooldown period is 1+2+1=4 times.

(2) Round up a ratio of the total quantity of times to an attack speed adjustment parameter, to obtain the number of displayed frames corresponding to the first cooldown period.

After the total quantity of times the cooldown time manager is called within the first cooldown period is obtained, the ratio of the total quantity of times to the attack speed adjustment parameter may be rounded up to obtain the number of displayed frames corresponding to the first cooldown period.

For example, assuming that the total quantity of times the cooldown time manager is called within the first cooldown period is N (N is a positive integer greater than 1), and the attack speed adjustment parameter is attackSpeed, the number of displayed frames frameRun corresponding to the first cooldown period may be expressed as:

$$FrameRun = Math \cdot ceil(N/attackSpeed).$$

In another possible implementation, the determining the number of displayed frames corresponding to the first cooldown period may include:

obtaining a value of a frame counter within the first cooldown period to obtain the number of displayed frames corresponding to the first cooldown period.

A value of the frame counter is accumulated by 1 each time a frame message is received, and is reset to zero when a cooldown period ends. After the counter is reset to zero, the counter may record the number of displayed frames corresponding to a next cooldown period.

Step 502. Determine an elapsed time of the target skill according to the number of displayed frames corresponding to the first cooldown period and the frame interval time.

After the number of displayed frames corresponding to the first cooldown period is obtained, the elapsed time of the target skill may be determined according to the number of displayed frames corresponding to the first cooldown period and the frame interval time. The elapsed time of the target skill refers to a time count from a start moment of the first cooldown period to a current moment.

For example, the elapsed time corresponding to the first cooldown period is elaspedTime, which may be expressed as:

$$ElaspedTime = FrameRun * deltaTime.$$

frameRun is the number of displayed frames corresponding to the first cooldown period, and deltaTime is the frame interval time.

Step 503. Determine a remaining time of the first cooldown period according to the elapsed time of the target skill and an initial time length of the first cooldown period.

Further, after the elapsed time of the target skill is obtained, the remaining time of the first cooldown period may be determined according to the elapsed time of the target skill and the initial time of the first cooldown period.

In a possible implementation, the remaining time cdTimeRemain of the first cooldown period may be expressed as:

$$cdTimeRemain = cdTime/attackSpeed - elaspedTime - cdOffsetValue.$$

cdTime represents the initial time of the first cooldown period, attackSpeed represents the attack speed adjustment parameter, elaspedTime represents the elapsed time of the target skill, and cdOffsetValue represents the compensation time corresponding to the first cooldown period.

In another possible implementation, the remaining time cdTimeRemain of the first cooldown period may be expressed as:

$$cdTimeRemain = cdTime/attackSpeed - frameRun*deltaTime - cdOffsetValue.$$

cdTime represents the initial time of the first cooldown period, attackSpeed represents the attack speed adjustment parameter, frameRun represents the number of displayed frames corresponding to the first cooldown period, deltaTime represents the frame interval time, and cdOffsetValue represents the compensation time corresponding to the first cooldown period.

In summary, in the technical solutions provided in the embodiments of this application, whether a first cooldown period ends is determined according to a remaining time of the first cooldown period and a frame interval time: a compensation time corresponding to the first cooldown period is determined according to an actual time of the first cooldown period and an adjusted cooldown time of a target skill when the first cooldown period ends; and further, an initial time length of a second cooldown period is determined based on the adjusted cooldown time and the compensation time. Compared to the related art, due to the constraint of the smallest measurement unit "frame", an error between the actual number of frames and the theoretical number of frames is large during accelerated play back. In the technical solutions provided in the embodiments of this application, by means of a time compensation manner, the number of frames overflowed previously is made up each time a skill is released, to ensure that the actual number of frames under acceleration is close to the theoretical number of frames, and reduce an error between the actual number of frames and the theoretical number of frames.

In addition, the elapsed time is optimized to an integer times of the frame message, and determining of the remaining time of the cooldown period is further optimized in combination with the compensation time.

The beneficial effects of the technical solutions provided in the embodiments of this application are explained below by comparing the error between the existing technical solutions and the technical solutions provided in the embodiments of this application.

Figure 6:
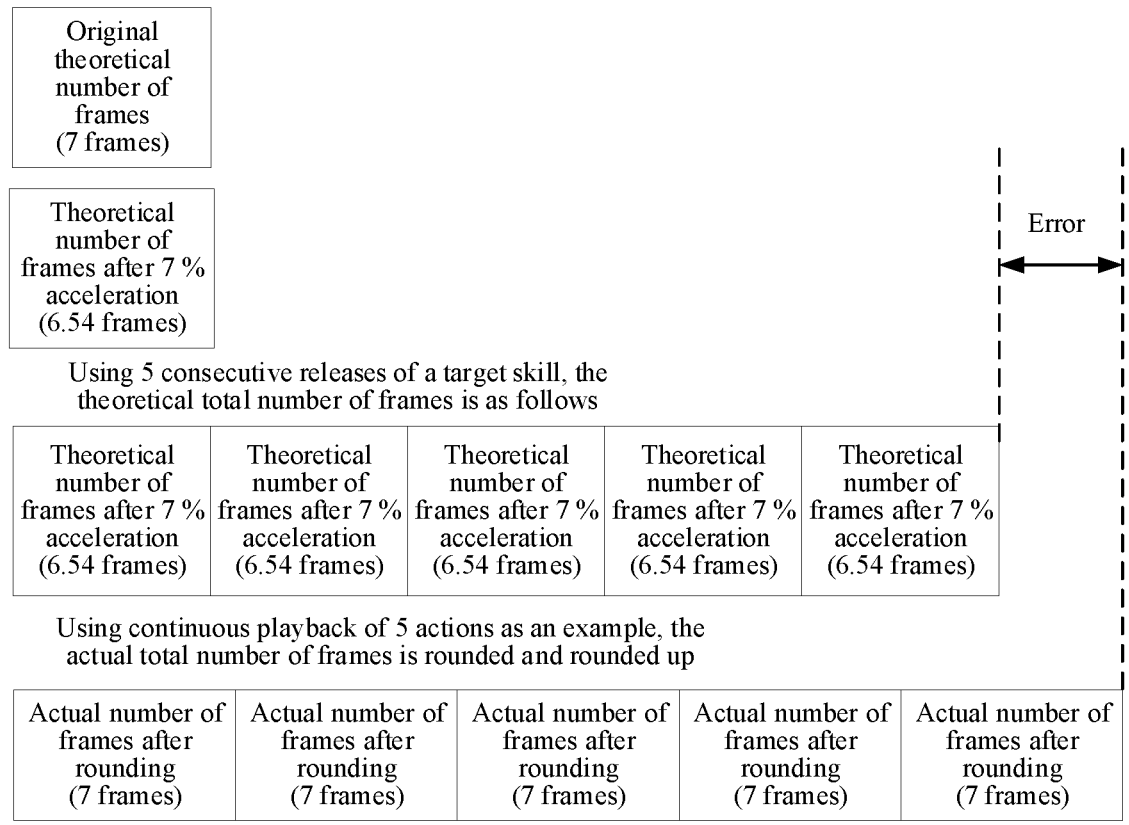
FIG. 6 exemplarily shows a schematic diagram of an error generated by using an existing technical solution.
Figure 7:
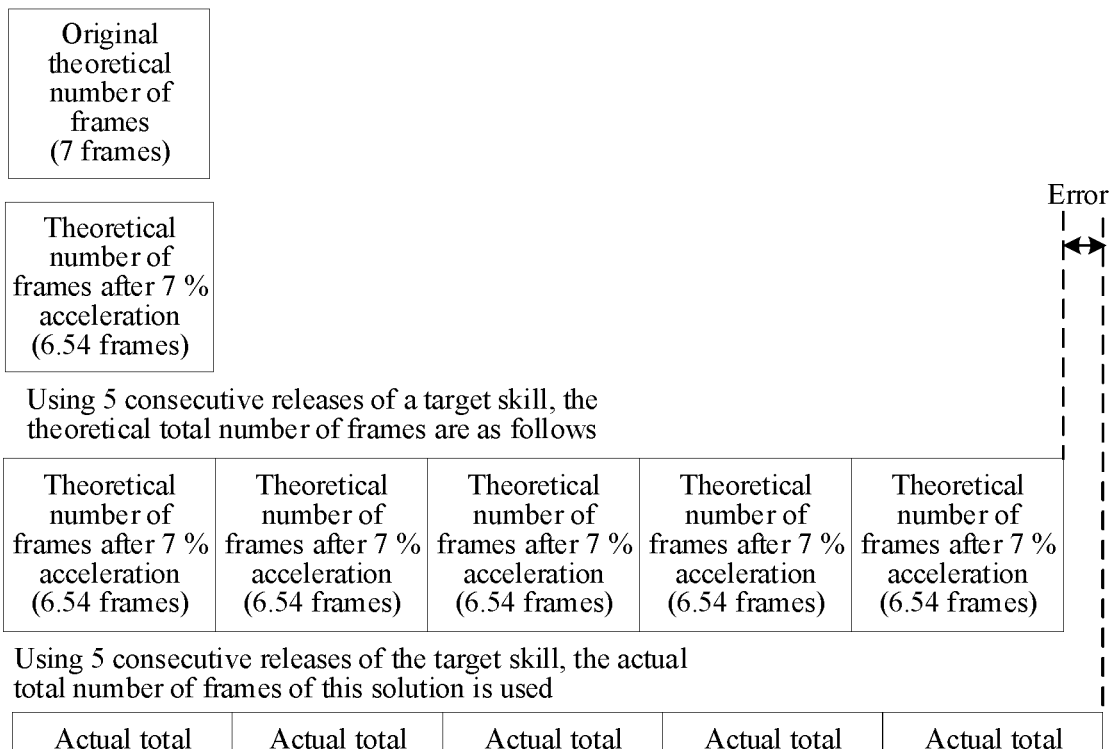
FIG. 7 exemplarily shows a schematic diagram of an error generated by using this solution.

FIG. 6 exemplarily shows a schematic diagram of an error generated by using an existing technical solution; and FIG. 7 exemplarily shows a schematic diagram of an error generated by using this solution.

The original theoretical number of frames is 7 frames, that is, an original cooldown time of the target skill is 7 frames; and the theoretical number of frames after 7% acceleration is 6.54 frames, that is, an adjusted cooldown time of the target skill is 6.54 frames.

Using 5 consecutive releases of the target skill as an example, when a related technology is used (such as rounding or rounding up), a difference between the actual total number of frames of the 5 consecutive releases of the target skill and the theoretical total number of frames is 2.3 frames; and an error between the actual total number of frames and the theoretical total number of frames is about 7%. However, after the technical solutions provided in the embodiments of this application are used, a difference between the actual total number of frames and the theoretical total number of frames of the target skill for 5 consecutive releases is 0.5 frames; and an error between the actual total number of frames and the theoretical total number of frames is about 1%.

Obviously, using the technical solutions provided in the embodiments of this application can effectively reduce a large error between the actual number of frames and the theoretical number of frames during accelerated playback.

The following is an apparatus embodiment of this application, which may be used for performing the method embodiments of this application. For details not disclosed in the apparatus embodiments of this application, refer to the method embodiments of this application.

Figure 8:
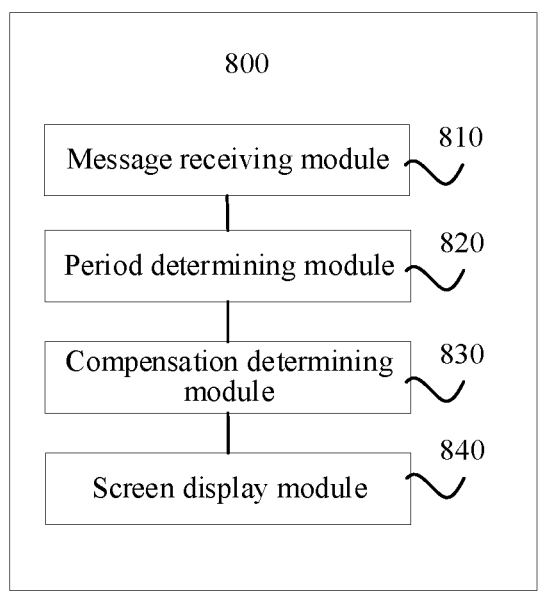
FIG. 8 is a block diagram of a frame display apparatus in a game application according to an embodiment of this application.

FIG. 8 shows a block diagram of a frame display apparatus in a game application according to an embodiment of this application. The apparatus has functions of implementing the foregoing frame display method in a game application. The functions may be implemented by hardware, or may be implemented by hardware executing corresponding software. The apparatus may be the terminal described above, or may be disposed on a terminal. The apparatus 800 may include: a message receiving module 810, a period determining module 820, a compensation determining module 830, and a screen display module 840.

The message receiving module 810 is configured to receive a frame message within a first cooldown period of a target skill, the frame message being used for driving to display a next image frame.

The period determining module 820 is configured to determine whether the first cooldown period ends, according to a remaining time of the first cooldown period and a frame interval time.

The compensation determining module 830 is configured to determine a compensation time corresponding to the first cooldown period, according to an actual time of the first cooldown period and an adjusted cooldown time of the target skill in response to that the first cooldown period ends.

The screen display module 840 is configured to display a skill release image of the target skill in the next image frame in response to the frame message, and enter a second cooldown period of the target skill, an initial time length of the second cooldown period being determined based on the adjusted cooldown time and the compensation time.

In summary, in the technical solutions provided in the embodiments of this application, whether a first cooldown period ends is determined according to a remaining time of the first cooldown period and a frame interval time: a compensation time corresponding to the first cooldown period is determined according to an actual time of the first cooldown period and an adjusted cooldown time of a target skill when the first cooldown period ends; and further, an initial time length of a second cooldown period is determined based on the adjusted cooldown time and the compensation time. Compared to the related art, due to the constraint of the smallest measurement unit "frame", an error between the actual number of frames and the theoretical number of frames is large during accelerated play back. The technical solutions provided in the embodiments of this application, by means of a time compensation manner, the number of frames overflowed previously is made up each time a skill is released, to ensure that the actual number of frames under acceleration/deceleration is close to the theoretical number of frames, and reduce an error between the actual number of frames and the theoretical number of frames, thereby ensuring that a specific skill is continuously released for a period of time. A quantity of times the skill can be released during this period of time is more proper and accurate, and an expected acceleration/deceleration effect is achieved, thereby making release rate control of a game skill more accurate.

In some possible designs, the compensation determining module 830 is configured to calculate a difference between the actual time of the first cooldown period and the adjusted cooldown time of the target skill to obtain the compensation time corresponding to the first cooldown period.

In some possible designs, the period determining module 820 is configured to determine that the first cooldown period ends, when the remaining time of the first cooldown period is less than or equal to the frame interval time; or determine that the first cooldown period does not end, when the remaining time of the first cooldown period is greater than the frame interval time; and update the remaining time of the first cooldown period, and display a skill cooling image of the target skill in the next image frame in response to the frame message.

In some possible designs, the period determining module 820 is configured to determine that the first cooldown period ends, when the remaining time of the first cooldown period is equal to 0; or determine that the first cooldown period does not end, when the remaining time of the first cooldown period is greater than 0 and less than the frame interval time; and update the remaining time of the first cooldown period to 0, and display a skill cooling image of the target skill in the next image frame in response to the frame message.

Figure 9:
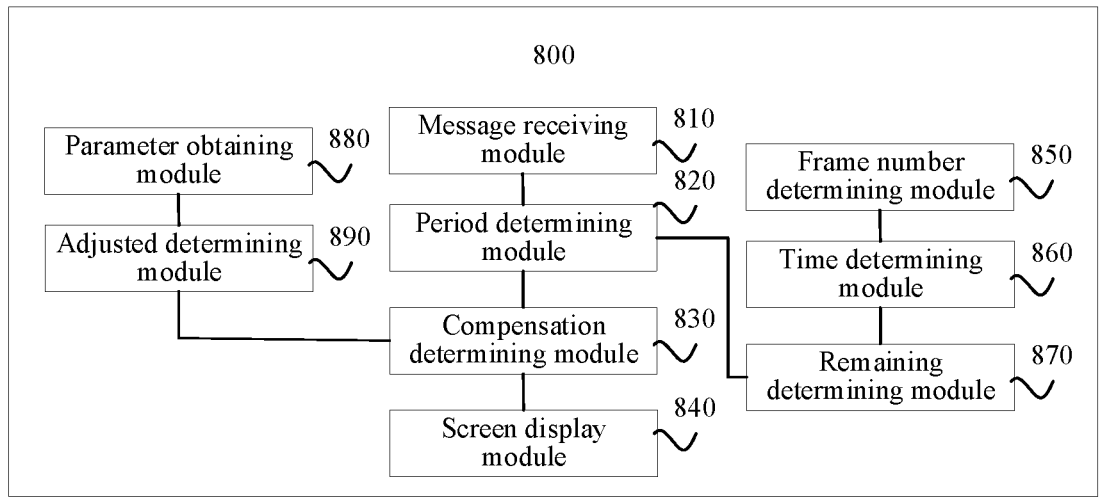
FIG. 9 is a block diagram of a frame display apparatus in a game application according to another embodiment of this application.

In some possible designs, as shown in FIG. 9, the apparatus 800 further includes: a frame number determining module 850, a time determining module 860, and a remaining determining module 870.

The frame number determining module 850 is configured to determine the number of displayed frames corresponding to the first cooldown period within the first cooldown period of the target skill.

The time determining module 860 is configured to determine an elapsed time of the target skill, according to the number of displayed frames corresponding to the first cooldown period and the frame interval time, the elapsed time being a time count from a start moment of the first cooldown period to a current moment.

The remaining determining module 870 is configured to determine a remaining time of the first cooldown period according to the elapsed time of the target skill and an initial time length of the first cooldown period.

In some possible designs, the frame number determining module 850 is configured to obtain a total quantity of times a cooldown time manager is called within the first cooldown period, the cooldown time manager being called k times each time a frame message is received, k being a rounded value of a sum of a residual value of an attack speed adjustment parameter corresponding to a previous frame and an attack speed adjustment parameter corresponding to a current frame, and k being a positive integer; and rounding up a ratio of the total quantity of times to an attack speed adjustment parameter, to obtain the number of displayed frames corresponding to the first cooldown period.

In some possible designs, the frame number determining module 850 is configured to obtain a value of a frame counter within the first cooldown period to obtain the number of displayed frames corresponding to the first cooldown period, a value of the frame counter being accumulated by 1 each time a frame message is received, and being reset to zero when a cooldown period ends.

In some possible designs, as shown in FIG. 9, the apparatus 800 further includes: a parameter obtaining module 880 and a rated determining module 890.

The parameter obtaining module 880 is configured to obtain an original cooldown time and an attack speed adjustment parameter of the target skill.

The adjusted determining module 890 is configured to determine the adjusted cooldown time of the target skill, according to the original cooldown time and the attack speed adjustment parameter.

When the functions of the apparatus provided in the foregoing embodiments are implemented, division of the functional modules is merely used an example for description. In actual application, the functions may be assigned to and completed by different functional modules according to requirements, that is, the internal structure of the apparatus is divided into different functional modules, to implement all or some of the functions described above. In addition, the apparatus and the method embodiments provided in the foregoing embodiments belong to the same concept. For the specific implementation process, refer to the method embodiments, and details are not described herein again.

Figure 10:
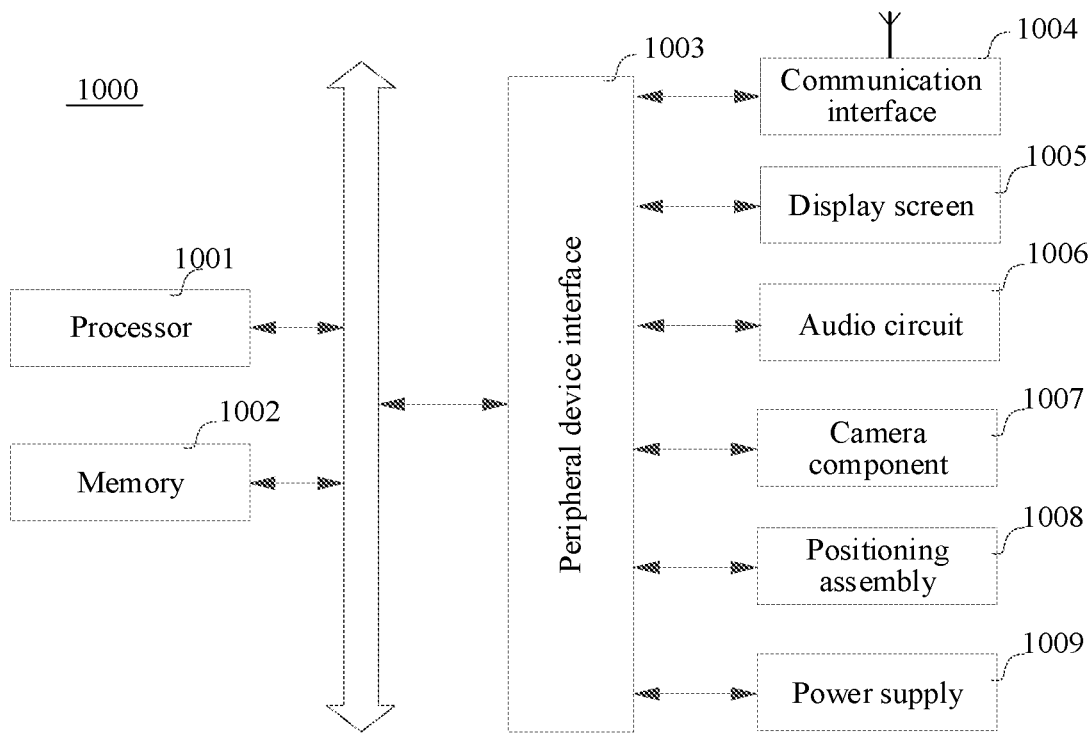
FIG. 10 is a structural block diagram of a terminal according to an embodiment of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit FIG. 10 shows a structural block diagram of a terminal according to an embodiment of this application. Generally, the terminal 1000 includes a processor 1001 and a memory 1002.

The processor 1001 may include one or more processing cores, for example, a 4-core processor or an 8-core processor. The processor 1001 may be implemented by using at least one hardware form of a digital signal processor (DSP), a field programmable gate array (FPGA), and a programmable logic array (PLA). The processor 1001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to be responsible for rendering and drawing content that a display screen needs to display. In some embodiments, the processor 1001 may further include an artificial intelligence (AI) processor. The AI processor is configured to process a computing operation related to machine learning.

The memory 1002 may include one or more computer-readable storage media. The computer-readable storage medium may be non-transient. The memory 1002 may further include a high-speed random access memory and a nonvolatile memory, for example, one or more disk storage devices or flash storage devices. In some embodiments, the non-transitory computer-readable storage medium in the memory 1002 is configured to store at least one instruction, at least one program, a code set, or an instruction set, the at least one instruction, the at least one program, the code set, or the instruction set being used for being executed by the processor 1001 to implement the frame display method in a game application provided in the method embodiments of this application.

In some embodiments, the terminal 1000 may include a peripheral device interface 1003 and at least one peripheral device. The processor 1001, the memory 1002, and the peripheral device interface 1003 may be connected through a bus or a signal line. Each peripheral device may be connected to the peripheral device interface 1003 through a bus, a signal line, or a circuit board. Specifically, the peripheral device may include: at least one of a communication interface 1004, a display screen 1005, an audio circuit 1006, a camera assembly 1007, a positioning assembly 1008, and a power supply 1009.

A person skilled in the art may understand that the structure shown in FIG. 10 constitutes no limitation on the terminal 1000, and the terminal may include more or fewer components than those shown in the figure, or some components may be combined, or a different component deployment may be used.

In an exemplary embodiment, a terminal is further provided. The terminal includes a processor and a memory, the memory storing at least one instruction, at least one program, a code set, or an instruction set, the at least one instruction, the at least one program, the code set, or the instruction set being loaded and executed by the processor to implement the foregoing frame display method in a game application.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing frame display method in a game application.

In an exemplary embodiment, the computer-readable storage medium may include: a read-only memory (ROM), a random access memory (RAM), a solid state drive (SSD), or an optical disk. The RAM may include a resistance random access memory (ReRAM) and a dynamic random access memory (DRAM).

In an exemplary embodiment, a computer program product is further provided, the computer program product, when executed by a processor, being used for implementing the foregoing frame display method in a game application. For example, a computer program product or a computer program is provided, the computer program product or the computer program including computer instructions, the computer instructions being stored in a computer-readable storage medium. A processor of a terminal reads the computer instructions from the computer-readable storage medium, and the processor executes the computer instructions, so that the terminal performs the frame display method in a game application.

It is to be understood that, "plurality of" mentioned in this specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

What is claimed is:

1. A frame display method in a game application, performed by a computer device, the method comprising:
   receiving a frame message within a first cooldown period of a target skill, the frame message being used for driving to display a next image frame;
   determining whether the first cooldown period ends, according to a remaining time of the first cooldown period and a frame interval time;
   in response to that the first cooldown period ends, determining a compensation time corresponding to the first cooldown period according to an actual time of the first cooldown period and an adjusted cooldown time of the target skill; and
   in response to the frame message, displaying a skill release image of the target skill in the next image frame and entering a second cooldown period of the target skill, an initial time length of the second cooldown period being determined based on the adjusted cooldown time and the compensation time.

2. The method according to claim 1, wherein the determining a compensation time corresponding to the first cooldown period according to an actual time of the first cooldown period and a adjusted cooldown time of the target skill comprises:
   calculating a difference between the actual time of the first cooldown period and the adjusted cooldown time of the target skill, to obtain the compensation time corresponding to the first cooldown period.

3. The method according to claim 1, wherein the determining whether the first cooldown period ends, according to a remaining time of the first cooldown period and a frame interval time comprises:
   when the remaining time of the first cooldown period is less than or equal to the frame interval time:
   determining that the first cooldown period ends; or
   when the remaining time of the first cooldown period is greater than the frame interval time:
   determining that the first cooldown period does not end, updating the remaining time of the first cooldown period, and
   displaying a skill cooling image of the target skill in the next image frame in response to the frame message.

4. The method according to claim 1, wherein the determining whether the first cooldown period ends, according to a remaining time of the first cooldown period and a frame interval time comprises:
   when the remaining time of the first cooldown period is equal to 0:
   determining that the first cooldown period ends; or
   when the remaining time of the first cooldown period is greater than 0 and less than the frame interval time:
   determining that the first cooldown period does not end, updating the remaining time of the first cooldown period to 0, and
   displaying a skill cooling image of the target skill in the next image frame in response to the frame message.

5. The method according to claim 1, further comprising:
determining a number of displayed frames corresponding to the first cooldown period within the first cooldown period of the target skill;
determining an elapsed time of the target skill according to the number of displayed frames corresponding to the first cooldown period and the frame interval time, the elapsed time being a time count from a start moment of the first cooldown period to a current moment; and
determining a remaining time of the first cooldown period according to the elapsed time of the target skill and an initial time length of the first cooldown period.

6. The method according to claim 5, wherein the determining a number of displayed frames corresponding to the first cooldown period comprises:
obtaining a total quantity of times a cooldown time manager is called within the first cooldown period, the cooldown time manager being called k times each time a frame message is received, k being a rounded value of a sum of a residual value of an attack speed adjustment parameter corresponding to a previous frame and an attack speed adjustment parameter corresponding to a current frame, and k being a positive integer; and
rounding up a ratio of the total quantity of times to an attack speed adjustment parameter, to obtain the number of displayed frames corresponding to the first cooldown period.

7. The method according to claim 5, wherein the determining a number of displayed frames corresponding to the first cooldown period comprises:
obtaining a value of a frame counter within the first cooldown period to obtain the number of displayed frames corresponding to the first cooldown period, wherein the value of the frame counter is accumulated by 1 each time a frame message is received, and is reset to zero when a cooldown period ends.

8. The method according to claim 1, further comprising:
obtaining an original cooldown time and an attack speed adjustment parameter of the target skill; and
determining the adjusted cooldown time of the target skill according to the original cooldown time and the attack speed adjustment parameter.

9. A computer device, comprising a processor and a memory, the memory storing at least one program, the at least one program being loaded and executed by the processor to perform a plurality of operations including:
receiving a frame message within a first cooldown period of a target skill, the frame message being used for driving to display a next image frame;
determining whether the first cooldown period ends, according to a remaining time of the first cooldown period and a frame interval time;
in response to that the first cooldown period ends, determining a compensation time corresponding to the first cooldown period according to an actual time of the first cooldown period and an adjusted cooldown time of the target skill; and
in response to the frame message, displaying a skill release image of the target skill in the next image frame and entering a second cooldown period of the target skill, an initial time length of the second cooldown period being determined based on the adjusted cooldown time and the compensation time.

10. The computer device according to claim 9, wherein the determining a compensation time corresponding to the first cooldown period according to an actual time of the first cooldown period and a adjusted cooldown time of the target skill comprises:
calculating a difference between the actual time of the first cooldown period and the adjusted cooldown time of the target skill, to obtain the compensation time corresponding to the first cooldown period.

11. The computer device according to claim 9, wherein the determining whether the first cooldown period ends, according to a remaining time of the first cooldown period and a frame interval time comprises:
when the remaining time of the first cooldown period is less than or equal to the frame interval time:
determining that the first cooldown period ends; or
when the remaining time of the first cooldown period is greater than the frame interval time:
determining that the first cooldown period does not end,
updating the remaining time of the first cooldown period, and
displaying a skill cooling image of the target skill in the next image frame in response to the frame message.

12. The computer device according to claim 9, wherein the determining whether the first cooldown period ends, according to a remaining time of the first cooldown period and a frame interval time comprises:
when the remaining time of the first cooldown period is equal to 0:
determining that the first cooldown period ends; or
when the remaining time of the first cooldown period is greater than 0 and less than the frame interval time:
determining that the first cooldown period does not end,
updating the remaining time of the first cooldown period to 0, and
displaying a skill cooling image of the target skill in the next image frame in response to the frame message.

13. The computer device according to claim 9, wherein the plurality of operations further comprise:
determining a number of displayed frames corresponding to the first cooldown period within the first cooldown period of the target skill;
determining an elapsed time of the target skill according to the number of displayed frames corresponding to the first cooldown period and the frame interval time, the elapsed time being a time count from a start moment of the first cooldown period to a current moment; and
determining a remaining time of the first cooldown period according to the elapsed time of the target skill and an initial time length of the first cooldown period.

14. The computer device according to claim 13, wherein the determining a number of displayed frames corresponding to the first cooldown period comprises:
obtaining a total quantity of times a cooldown time manager is called within the first cooldown period, the cooldown time manager being called k times each time a frame message is received, k being a rounded value of a sum of a residual value of an attack speed adjustment parameter corresponding to a previous frame and an attack speed adjustment parameter corresponding to a current frame, and k being a positive integer; and
rounding up a ratio of the total quantity of times to an attack speed adjustment parameter, to obtain the number of displayed frames corresponding to the first cooldown period.

15. The computer device according to claim 13, wherein the determining a number of displayed frames corresponding to the first cooldown period comprises:
  obtaining a value of a frame counter within the first cooldown period to obtain the number of displayed frames corresponding to the first cooldown period, wherein
  the value of the frame counter is accumulated by 1 each time a frame message is received, and is reset to zero when a cooldown period ends.

16. The computer device according to claim 9, wherein the plurality of operations further comprise:
  obtaining an original cooldown time and an attack speed adjustment parameter of the target skill; and
  determining the adjusted cooldown time of the target skill according to the original cooldown time and the attack speed adjustment parameter.

17. A non-transitory computer-readable storage medium, storing at least one program, the at least one program being loaded and executed by a processor of a computer device to perform a plurality of operations including:
  receiving a frame message within a first cooldown period of a target skill, the frame message being used for driving to display a next image frame;
  determining whether the first cooldown period ends, according to a remaining time of the first cooldown period and a frame interval time;
  in response to that the first cooldown period ends, determining a compensation time corresponding to the first cooldown period according to an actual time of the first cooldown period and an adjusted cooldown time of the target skill; and
  in response to the frame message, displaying a skill release image of the target skill in the next image frame and entering a second cooldown period of the target skill, an initial time length of the second cooldown period being determined based on the adjusted cooldown time and the compensation time.

18. The non-transitory computer-readable storage medium according to claim 17, wherein the determining a compensation time corresponding to the first cooldown period according to an actual time of the first cooldown period and a adjusted cooldown time of the target skill comprises:
  calculating a difference between the actual time of the first cooldown period and the adjusted cooldown time of the target skill, to obtain the compensation time corresponding to the first cooldown period.

19. The non-transitory computer-readable storage medium according to claim 17, wherein the determining whether the first cooldown period ends, according to a remaining time of the first cooldown period and a frame interval time comprises:
  when the remaining time of the first cooldown period is less than or equal to the frame interval time:
    determining that the first cooldown period ends; or
  when the remaining time of the first cooldown period is greater than the frame interval time:
    determining that the first cooldown period does not end,
    updating the remaining time of the first cooldown period, and
    displaying a skill cooling image of the target skill in the next image frame in response to the frame message.

20. The non-transitory computer-readable storage medium according to claim 17, wherein the determining whether the first cooldown period ends, according to a remaining time of the first cooldown period and a frame interval time comprises:
  when the remaining time of the first cooldown period is equal to 0:
    determining that the first cooldown period ends; or
  when the remaining time of the first cooldown period is greater than 0 and less than the frame interval time:
    determining that the first cooldown period does not end,
    updating the remaining time of the first cooldown period to 0, and
    displaying a skill cooling image of the target skill in the next image frame in response to the frame message.

* * * * *